M. E. WILSON.
FLY TRAP.
APPLICATION FILED OCT. 31, 1914.
1,132,141. Patented Mar. 16, 1915.
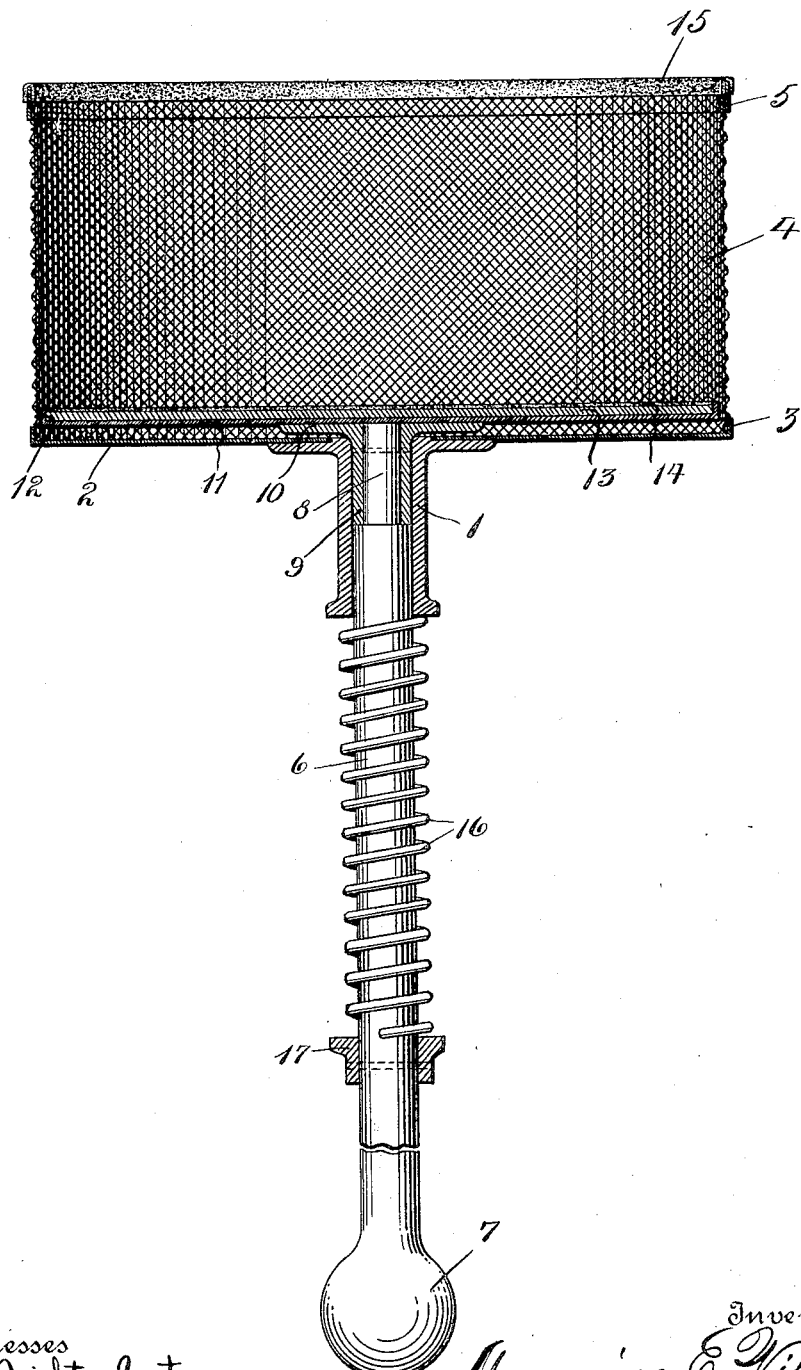

UNITED STATES PATENT OFFICE.

MAURICE E. WILSON, OF PERRY, OHIO.

FLY-TRAP.

1,132,141.  Specification of Letters Patent.  Patented Mar. 16, 1915.

Application filed October 31, 1914. Serial No. 869,630.

*To all whom it may concern:*

Be it known that I, MAURICE E. WILSON, a citizen of the United States, residing at Perry, in the county of Lake and State of Ohio, have invented certain new and useful Improvements in Fly-Traps, of which the following is a specification.

My invention relates to insect destroying devices, particularly to fly catchers, and has for its object the provision of a device adapted for catching flies upon flat surfaces, such as walls and especially ceilings, without danger of marring the surface through striking it or crushing the fly upon it, the device embodying the use of sticky fly paper, means being provided for preventing contact of the fly paper with the surface upon which the fly is resting, and means for preventing the adhesive material from running off.

Other objects and advantages such as simplicity and cheapness in manufacture, ease of operation, efficiency and durability in service and the general improvement of the art will become apparent during the course of the following description taken together with the accompanying drawing in which the figure is a longitudinal sectional view through the device.

Referring more particularly to the drawing, my device comprises a tubular supporting shank 1 upon which is secured a flat plate 2 having an annular flange 3 to which is secured the cage portion of my device which comprises a preferably cylindrical body member or shell 4 formed preferably of wire screen or gauze. The upper free edge of the body member 4 may be strengthened in any desired manner as for instance by securing upon it an annular metallic band 5. The parts just described constitute the relatively stationary portion of my device.

The movable portion of the device comprises a rod 6 provided at its lower end with a handle 7 and having secured upon its upper reduced end 8 a socket 9 terminating in a flat disk 10 upon which is secured in any desired manner a plate 11 having an upturned annular flange 12. The socket 9 and rod 6 are flush with each other and are slidably disposed within the tubular shank 1. The plate 11 having the flange 12 constitutes a pan for the retention of a sheet 13 of fly paper of the type provided with an adhesive coating 14.

The device is used by placing the cage or body portion 4 over and around a fly or other insect to be caught, the upper edge of the metallic band 5 being provided with a covering 15 of felt or other material to prevent marring the surface upon which the insect is resting. The rod 6 is then moved by the operator whereupon the plate 11 carrying the sticky fly paper will be moved inwardly. This movement will alarm the fly or other insect which will consequently fly against and be caught upon the fly paper in its efforts to escape.

In order to prevent the fly paper from contacting with the ceiling, wall or other surface upon which a fly may be resting and in order to return the plate 11 to its initial position, I provide a coil spring 16 surrounding the rod 6 and abutting against the lower end of the tubular shank 1 and against a stop collar 17 secured upon the rod. As the rod 6 is moved inwardly in the operation of catching a fly the spring 16 will be compressed, the several coils contacting with each other and preventing the plate 11 from being carried sufficiently inwardly to contact with the ceiling, wall or other surface. After the insect has been caught, the pressure upon the rod 6 is released whereupon the spring 16 will return the plate 11 and rod 6 to their initial positions.

It will be obvious that the device may be used repeatedly until the fly paper has been entirely covered with captured insects after which a new sheet of the adhesive material may be inserted.

The device is particularly useful in catching flies upon ceilings where they are inaccessible to the ordinary catching or killing devices such as the well known " swatters." An additional advantage is that the flies are held and not merely knocked onto the floor to be trampled upon or into dishes, eatables and the like, thus offering a more cleanly mode of killing.

Having thus described my invention what I claim is:

1. An insect destroying device comprising a cage portion, a plate movable therein and carrying a sheet of material coated with an adhesive, and a rod secured to said plate whereby said plate may be moved within said cage portion into proximity to the open end thereof.

2. An insect destroying device comprising a cage portion having one end open, a plate slidable in said cage portion and carrying a sheet of sticky fly paper, a handle secured to said plate whereby said plate may be moved within said cage portion into proximity to the open end thereof, and means for limiting the movement of said plate and handle.

3. An insect destroying device comprising a cage portion, an apertured closure secured to one end thereof, a plate slidable within said cage portion and carrying a removable sheet of sticky fly paper, a rod extending through said apertured closure and secured to said plate whereby said plate may be moved, and means for limiting the movement of said plate, said means comprising a stop collar secured on said rod and a coil spring disposed around said rod and abutting against said closure and said collar, the maximum compression of said spring occurring before said plate reaches the open end of said cage portion.

4. An insect destroying device comprising a tubular shank, a flanged plate secured thereto, a shell of foraminous material secured to said flanged plate, said plate forming a closure for one end of said shell, a rod slidable through said tubular shank, a plate connected with said rod and provided with an annular retaining flange, said second named flanged plate carrying a sheet of sticky fly paper, movement of said rod moving said second named plate within said shell, and means for preventing the fly paper from contacting with a surface against which the open end of said shell is placed.

In testimony whereof I hereto affix my signature in the presence of two witnesses.

MAURICE E. WILSON.

Witnesses:
 ROSA E. BLACKMORE,
 TERESA E. FERRON.

Copies of this patent may be obtained for five cents each, by addressing the "Commissioner of Patents, Washington, D. C."